United States Patent
Anand et al.

(10) Patent No.: US 7,139,816 B2
(45) Date of Patent: Nov. 21, 2006

(54) METHOD, APPARATUS, AND PROGRAM FOR SERVER BASED NETWORK COMPUTER LOAD BALANCING ACROSS MULTIPLE BOOT SERVERS

(75) Inventors: Vaijayanthimala K. Anand, Austin, TX (US); Steven Michael French, Austin, TX (US); Chakkalamattam Jos Paul, Austin, TX (US); James Richard Schoech, Round Rock, TX (US); Bradford Allen Stern, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 09/740,565

(22) Filed: Dec. 18, 2000

(65) Prior Publication Data

US 2002/0078188 A1 Jun. 20, 2002

(51) Int. Cl.
*G06F 15/177* (2006.01)
(52) U.S. Cl. .................... 709/220; 709/221; 713/1; 713/2; 713/100
(58) Field of Classification Search ........ 709/220–222, 709/227, 217, 219, 223; 713/1, 2, 100
See application file for complete search history.

(56) References Cited

U.S. PATENT DOCUMENTS 4,815,076 A * 3/1989 Denney et al. ............... 714/26
5,548,724 A * 8/1996 Akizawa et al. ............. 709/203
5,586,327 A   12/1996 Bealkowski et al. ........ 395/652

(Continued)

OTHER PUBLICATIONS

Preboot Execution Environment (PXE) Specification, Version 2.1, Intel Corporation, Sep.*

(Continued)

*Primary Examiner*—John Follansbee
*Assistant Examiner*—Mohammad Siddiqi
(74) *Attorney, Agent, or Firm*—Duke W. Yee; Marilyn Smith Dawkins; Francis Lammes (57) ABSTRACT

A method, system, and program is provided to redirect a client computer to an appropriate boot server after it has been directed to any initial boot server by preboot execution environment (PXE) or similar services. An apparatus includes a data file containing a set of addresses of managed boot servers in any syntax and a program file containing a network bootstrap program (NBP) that interprets the syntax of the data file. These files are placed on every initial boot server. The NBP requests a file from the initial boot server whose name is identified with the client computer. The initial boot server will not return that file if it is not an appropriate server for booting the client. In that case, the NBP requests the data file containing the boot server addresses. The NBP then polls each of those boot servers by requesting the client's unique file. A boot server that returns the file is an appropriate boot server for the client computer. The data file containing boot server addresses is changed to reflect current boot server load balancing requirements without involving the configuration or affecting the availability of PXE or similar services.

22 Claims, 4 Drawing Sheets

U.S. PATENT DOCUMENTS

| | | | |
|---|---|---|---|
| 5,687,320 A * | 11/1997 | Wiley et al. | 709/245 |
| 5,729,685 A * | 3/1998 | Chatwani et al. | 709/224 |
| 5,774,660 A * | 6/1998 | Brendel et al. | 709/201 |
| 5,870,554 A * | 2/1999 | Grossman et al. | 713/2 |
| 5,960,175 A * | 9/1999 | Grossman et al. | 709/222 |
| 5,996,086 A * | 11/1999 | Delaney et al. | 714/4 |
| 6,079,033 A * | 6/2000 | Jacobson et al. | 714/47 |
| 6,317,826 B1 | 11/2001 | McCall et al. | 713/1 |
| 6,345,294 B1 * | 2/2002 | O'Toole et al. | 709/222 |
| 6,490,677 B1 | 12/2002 | Aguilar et al. | 713/1 |
| 6,601,096 B1 * | 7/2003 | Lassiter, Jr. | 709/222 |
| 6,684,327 B1 * | 1/2004 | Anand et al. | 713/2 |
| 6,735,692 B1 | 5/2004 | Murphrey et al. | 713/1 |
| 6,810,478 B1 | 10/2004 | Anand et al. | 713/2 |
| 2001/0056462 A1 | 12/2001 | Kataoka | 709/203 |

OTHER PUBLICATIONS

Windows NT 5.0, Remote Installation Service, Published by Microsoft, 1998.*

Windows 2000 Server, Remote Operating System Installation, Published by Microsoft, Sep. 1999.*

PXE Product Development Kit Instructions, version 3.0, published by Intel corporation, Aug. 27, 1999.*

\* cited by examiner

METHOD, APPARATUS, AND PROGRAM FOR SERVER BASED NETWORK COMPUTER LOAD BALANCING ACROSS MULTIPLE BOOT SERVERS

BACKGROUND OF THE INVENTION

1. Technical Field

The present invention relates to client computers that are bootable over a network and, in particular, to client computers that are enabled to be serviced by multiple boot server computers. The present invention provides a method, apparatus, and program to direct client computers to their assigned primary or back-up boot server computer to achieve load balancing across multiple boot server computers.

2. Description of Related Art

Some current personal computer motherboards, network adapters, and boot diskettes include support for the Preboot Execution Environment (PXE) to download an operating system (OS) from the network. PXE relies on extensions to the bootstrap protocol (BOOTP) and dynamic host configuration protocol (DHCP) to identify the source of the OS. PXE uses the trivial file transfer protocol (TFTP) to download the OS. PXE requires the services of a DHCP server, a PXE proxy server, a boot image negotiation layer (BINL) server and a TFTP server.

BOOTP is a a protocol that operates on networks that can also operate the transmission control protocol/Internet protocol (TCP/IP). BOOTP was developed to be used by a diskless workstation or network computer (NC) to obtain its own IP address, the IP address of a boot server, and the name of the file on that boot server that the client could request to start the download of its OS. Upon startup, the client station sends out a BOOTP request to the BOOTP server, which returns the required information. The BOOTP request and response use an IP broadcast function that can send messages before a specific IP address is known. BOOTP requires that an IP address be manually pre-assigned to each client when the BOOTP server is configured. Only one OS file name can be entered when the BOOTP server is configured, so all clients must receive the same OS. The software that transfers the OS files to the client must run on the same physical server as the BOOTP server software that supplies the IP addresses and OS file name information to the client.

DHCP is a protocol based on the BOOTP protocol that was developed to offer improved flexibility for the configuration of computers attached to a network. DHCP servers operate software that automatically assigns IP addresses to client stations logging onto a TCP/IP network. DHCP eliminates having to manually assign permanent IP addresses to clients.

DHCP can also redirect client stations that need to be booted to a BINL server to obtain boot information, permitting client configuration and client boot to be administered separately. In fact, two different servers can respond to the initial DHCP request from a client. A "standard" DHCP server offers the client an IP address. A proxy DHCP, also called a "PXE proxy" server, redirects the client to a BINL server.

The BINL server references the address of a TFTP boot server and the name of the file to request from the TFTP boot server that contains a network bootstrap program (NBP). The client communicates with the BINL server using DHCP-formatted messages.

PXE enables a client network computer that lacks a native operating system to locate and identify an NBP through a network attachment using DHCP and its extensions. PXE also enables the client network computer to acquire the NBP from the TFTP server through that network attachment. PXE also provides a means for running the NBP on the client to continue the network acquisition of additional software required create a user software environment that makes the client capable of performing the more complex and useful tasks assigned to it by an enterprise.

A facilitating property of DHCP is that the client does not initially need to know the address of any other computer. The client performs a DHCP broadcast to discover any DHCP server or PXE proxy server that can recognize that the client is PXE-capable. The DHCP server or PXE proxy server sends a DHCP offer to the client, which contains the address of a BINL server. The client then sends a BINL request to that BINL server. The BINL server returns a BINL reply that references the address of a TFTP boot server and the name of a file from which the client may obtain the NBP. The client then obtains the NBP and all necessary software from the boot server via the TFTP.

Enterprises use PXE as well as DHCP and its extensions as tools to aid the deployment of user software environments to clients through a network from centrally managed boot servers. Recently, user software environments deployed in this manner often include more programs than just the OS and are specific to a selected user or class of users. Other programs, such as Web browsers, Java virtual machines and even business application programs that are needed to make client computers truly productive are being deployed and supported on widely dispersed clients from centrally managed servers through "server-managed client networks."

Information technology (IT) administrators can use server-managed client networks to centrally maintain user software environments as well as dynamically distribute, and redistribute, these user software environments to clients in response to the changing computational work needs of an enterprise. This provides increased efficiency to lower the total cost of ownership (TCO) of client computers and enhances IT as a strategic tool for enterprises.

As the number of server-managed clients and the size of user software environments both grow, it is increasingly unlikely that a single boot server can bear the entire load for boot services for an enterprise. Multiple boot servers are needed to distribute the boot services load as well as to provide back-up reliability. Applications supplied by vendors to help IT administrators configure server-managed client networks need to be able to perform boot services load balancing by allowing clients to at least be statically assigned to different boot servers. Load balancing would be enhanced if the application were also able to dynamically reassign clients to different boot servers as there are changes in the availability and loading of individual boot servers.

Current approaches to assigning PXE-capable clients to boot servers have a dependency on the server redirection configurations of DHCP, PXE proxy, and BINL services. These services are delivered by multiple vendors, such as Intel, IBM and Microsoft, with different implementations and behaviors on each platform. When attempting to manage the assignment of clients to boot servers for load balancing, there is the problem of how to seamlessly and concurrently update the server redirection configurations of these services without having to write a lot of unique code per service, per platform and per vendor. In addition, many of these services have to be stopped and restarted to make and integrate every configuration change. This is an expensive process, is platform specific, and adversely affects the availability of these services.

A recent enhancement to PXE and DHCP is the addition of optional extensions that can provide the user of the client computer with a list or menu of possible boot servers from which to choose. This improves upon the standard implementation where each client could only be directed to a single boot server based on a client machine identifier, architecture class, or network interface type. However, it is unlikely that users of client computers presented with these lists of boot servers would be sufficiently aware of the current availability and loading of boot servers to be able to make boot server selections that would optimize load balancing. These lists of boot servers could be updated to reflect options according to the current network environment, but this would require updates to the DHCP or PXE proxy service configurations with the disadvantages described previously. Also, not all PXE configurations deployed in enterprises support the new extensions that provide the list of boot servers.

Another possible network configuration option is to provide multiple sets of DHCP, PXE proxy and BINL servers, with each set statically configured to redirect clients to a different boot server. These services could simply be stopped when their associated boot server was unavailable or too heavily loaded so that no more booting clients would be directed to that boot server. These services would be restarted when the boot server was again able to service booting clients.

This solution requires the server-managed client application to manage the starting and stopping of these services, possibly even when they are located on different physical servers. It also does not support the assignment of clients or support of particular user software environments to one boot server or a subset of boot servers. This is because PXE definition does not specify how the PXE support resident on the client selects among the competing DHCP offer packets that it would receive from each DHCP and PXE proxy server. Therefore, there is no guarantee that a client would be directed to its appropriate boot server unless each DHCP and PXE proxy server were configured with a list of clients that it was allowed to respond to. This requires per-client configuration of these servers which is more arduous than per-server configuration because the population of clients is likely to be larger and more changeable than is the population of servers. Each change in the client population would require changes in the configuration of DHCP or PXE proxy servers, with the disadvantages described previously.

Therefore, it would be advantageous to have a method and apparatus for server-based network computer load balancing across multiple boot servers that is independent of the operation of PXE support on the client and independent of the operation and configuration of DHCP, PXE proxy, and BINL services.

SUMMARY OF THE INVENTION

The present invention solves the disadvantages of the prior art by providing a method, apparatus, and program to redirect a client computer to an appropriate boot server after it has been directed to any initial boot server by preboot execution environment (PXE) or similar services. The apparatus of this invention includes a data file containing a set of addresses of managed boot servers and a program file containing a network bootstrap program (NBP) that can interpret the syntax of the data file. The data file has the same name on every initial boot server so that the bootstrap can find it.

The NBP requests a file from the initial boot server whose name is identified with the client computer. The initial boot server will not return that file if it is not an appropriate server for booting the client. In that case, the NBP requests the data file containing the boot server addresses. The NBP then polls each of those boot servers by requesting the client's unique file. A boot server that returns the file is an appropriate boot server for the client computer.

The data file containing boot server addresses is changed to reflect current boot server load balancing requirements without involving the configuration or affecting the availability of PXE or similar services.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
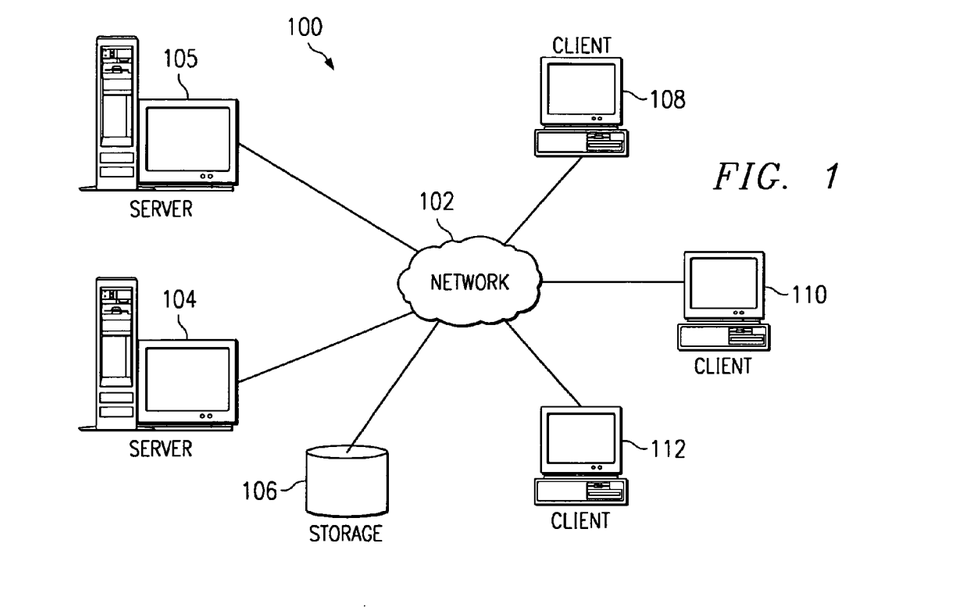
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104, 105 are connected to network 102 along with storage unit 106. In addition, clients 108, 110, and 112 also are connected to network 102. These clients 108, 110, and 112 may be, for example, personal computers or network computers. In the depicted example, servers 104, 105 provide data, such as boot files, operating system images, and applications to clients 108–112. Clients 108, 110, and 112 may be clients to server 104 or server 105. Network data processing system 100 may include additional servers, clients, and other devices not shown. In the depicted example, network data processing system 100 may be the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as any of a number of different types of networks, such as for example, an intranet, a local area network (LAN), or a wide area network (WAN). FIG. 1 is intended as an example, and not as an architectural limitation for the present invention.

The present invention provides a network environment, which may include multiple DHCP/PXE proxy servers, such as servers 104, 105, and multiple BINL and boot servers, which may be located together on servers 104, 105 with the DHCP/PXE proxy servers. A client computer, such as one of clients 108, 110, 112, includes pre-boot extensions to download operating system information from a boot server. The client computer sends a DHCP discover broadcast. If there are multiple DHCP/PXE proxy servers in the network, and they are all configured to respond to any client, then all of those servers will respond to the DHCP discover broadcast with a DHCP offer. However, there is no way to determine which of the DHCP offers the client will accept. Consequently, there is no way to determine to which BINL server and then which boot server the client will be directed unless all the DHCP/PXE proxy servers are configured to redirect all clients to the same BINL and boot servers. Such a configuration would not support load balancing among boot servers.

One solution may be to configure each DHCP/PXE proxy server on a client-by-client basis. All of the DHCP/PXE proxy servers may be configured identically to direct each of the same subsets of specific clients to the same specific boot servers. Alternatively, each DHCP/PXE proxy server may be configured to respond to only a specific subset of clients and direct all of that subset to a boot server that is uniquely associated with that DHCP/PXE proxy server. For example, the DHCP/PXE proxy server on hardware server 104 may be configured to respond to clients 108, 110, while the DHCP/PXE proxy server on hardware server 105 may be configured to respond to client 112. Several other solutions are possible that are variations to these example configurations.

However, these solutions have several disadvantages. Such client-by-client configuration is cumbersome, particularly in a large enterprise where there may be hundreds or thousands of clients being serviced by multiple servers. Clients will change far more frequently than servers, resulting in frequent reconfiguration of the servers. Load balancing must be maintained by changing the configurations of DHCP/PXE proxy servers in addition to managing boot servers. Client offer response sets configured for each of the DHCP/PXE proxy servers must be kept disjoint if the assignment of clients to boot servers to support load balancing is disjoint. In that case, the DHCP/PXE proxy servers cannot provide backup redundancy to each other. Each client listed in a DHCP/PXE proxy server configuration can be directed to at most one boot server. Therefore, boot servers cannot provide any backup redundancy to each other.

Still further, the configuration of clients assigned to boot servers must be changed whenever the roles of the boot servers change. Also, this configuration is difficult to change dynamically. Thus, the present invention provides a method, apparatus, and program for providing server-based network computer load balancing across multiple boot servers while overcoming the disadvantages of the prior art and the above problems.

In accordance with a preferred embodiment of the present invention, each client computer receives the same initial NBP from each and every boot server, whether or not the boot server is an appropriate server configured to service that client by the enterprise's primary server-managed client service. In the case where the DHCP/PXE proxy server has not directed the client to an appropriate boot server, the client's specific configuration information file will not have been placed on that server by the enterprise's primary server-managed client service. When the initial NBP requests the client's specific configuration information file, it will receive an error response indicating that the file is not present on the boot server to which the client was originally directed. In this case, the initial NBP will subsequently request a boot server list file from the boot server via TFTP.

The boot server list file, which may be an American standard code for information interchange (ASCII) file or other known file structure, contains a set of the addresses of boot servers configured by the enterprise's primary server-managed client service. The boot server list file has a fixed name and a fixed location that is the same on every boot server so that any client can find it on any boot server. The following is an example of a boot server list file:

[BOOTSERVERS]
;List of known Boot Servers (containing tftp files, ;boot image)
IP=9.3.198.234
IP=9.3.198.235

The file syntax, in addition to the IP addresses, makes programming the NBP simple and permits the file contents to be extended for possible other uses.

One such extension would be an entry which indicates that the enterprise's primary server-managed client service has already placed the boot server addresses in an optimal search order to support load balancing. In that case, the NBP would poll the boot servers in the listed order. Otherwise, the NBP could use another search order, for instance a randomized order to prevent simultaneous polls to the same boot server from many clients that are booting simultaneously, or an order based on the relative proximity of each boot server as determined from the boot server address and network topology information obtained from DHCP packets. As an example of this process the servers within the client's subnet could be contacted first, or the client could fist "ping" the servers in the list to estimate round trip delay, number of hops (number of intermediate network routers) or other measures of distance between the client and server and use this measurement to temporarily save a re-ordered version of the boot server list—i.e. a list of servers from best (or closest to the client) to worst (farthest).

Once the NBP obtains, and optionally re-orders, the boot server list file, it will query each of the boot servers via the TFTP support provided to the NBP by PXE, using the addresses in the list file, until it finds a boot server with the client's specific configuration information file. Thereafter, the client acquires the remaining software from that appropriate boot server.

Figure 2:
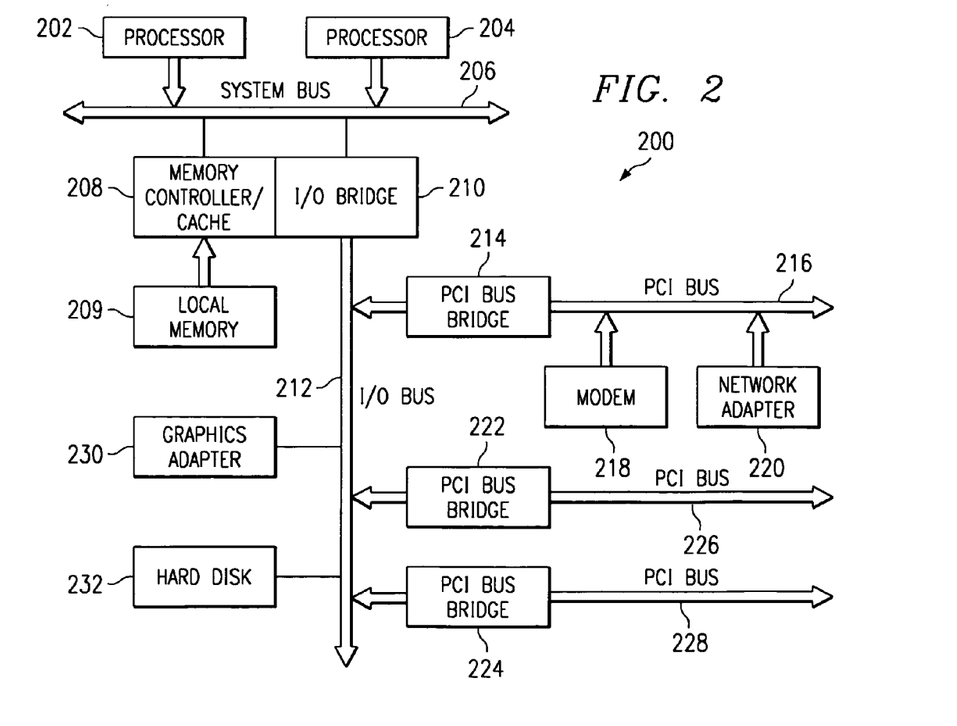
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
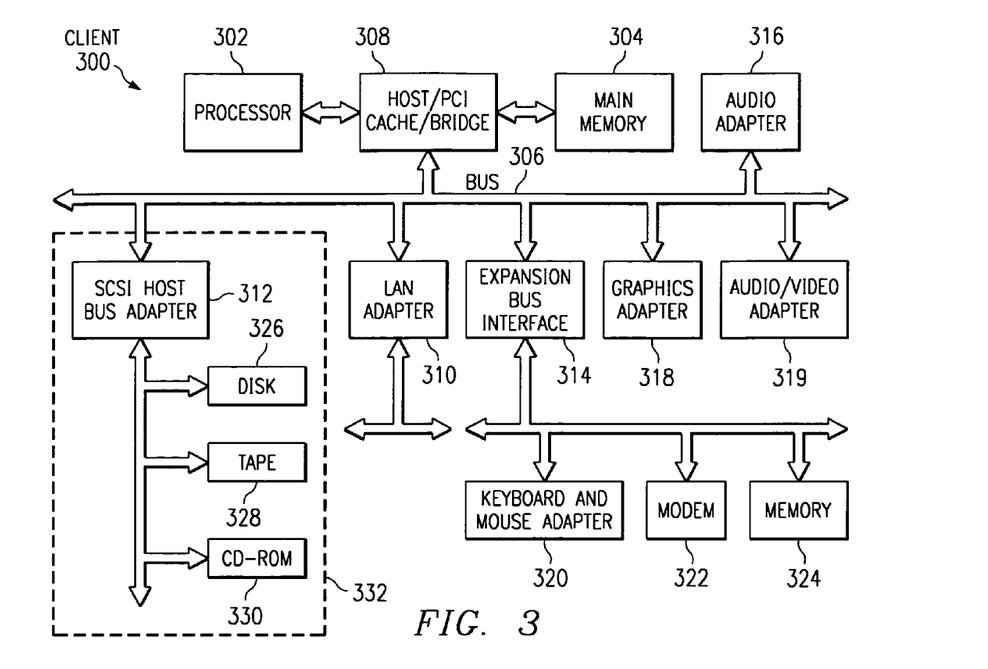
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk, a Web appliance, or a telephony device.

Figure 4:
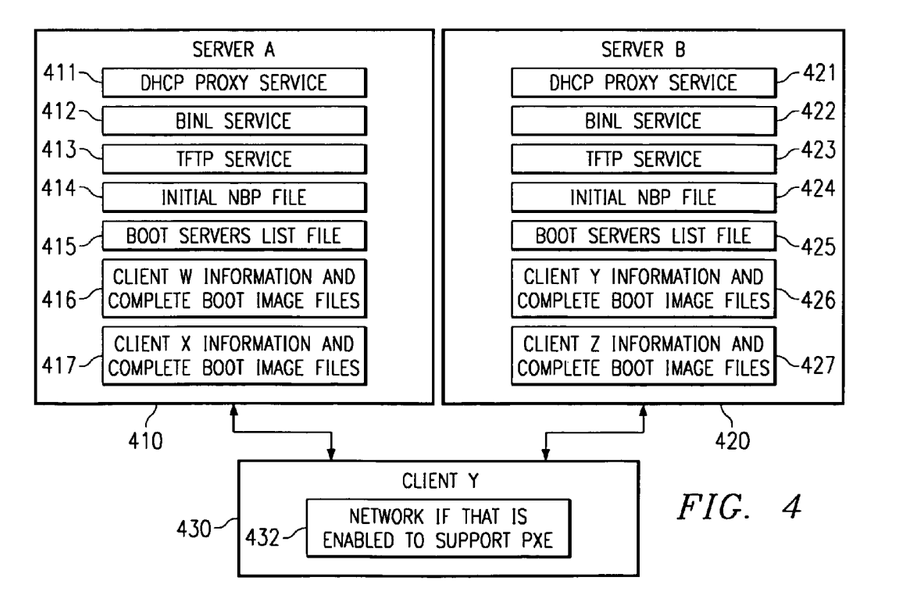
FIG. 4 is an exemplary client/server configuration in accordance with a preferred embodiment of the present invention.

With reference now to FIG. 4, an exemplary client/server configuration is shown in accordance with a preferred embodiment of the present invention. Server A 410 and server B 420 may service client Y 430. Server A and server B may be servers 104, 105 and client Y may be one of clients 108, 110, 112 in FIG. 1. Server A includes DHCP proxy service 411, BINL service 412, and TFTP service 413. Server A also includes initial NBP file 414 and boot servers list file 415. Similarly, server B includes DHCP proxy service 421, BINL service 422, and TFTP service 423, as well as initial NBP file 424 and boot servers list file 425.

Furthermore, server A includes client W information and complete boot image files 416 and client X information and complete boot image files 417. Server B includes client Y information and complete boot image files 426 and client Z information and complete boot image files 427. In other words, server A is currently assigned to be a boot server for client W and client X, while server B is currently assigned to be a boot server for client Y and client Z. Client Y 430 includes a network interface 432 that is enabled to support PXE.

Figure 5:
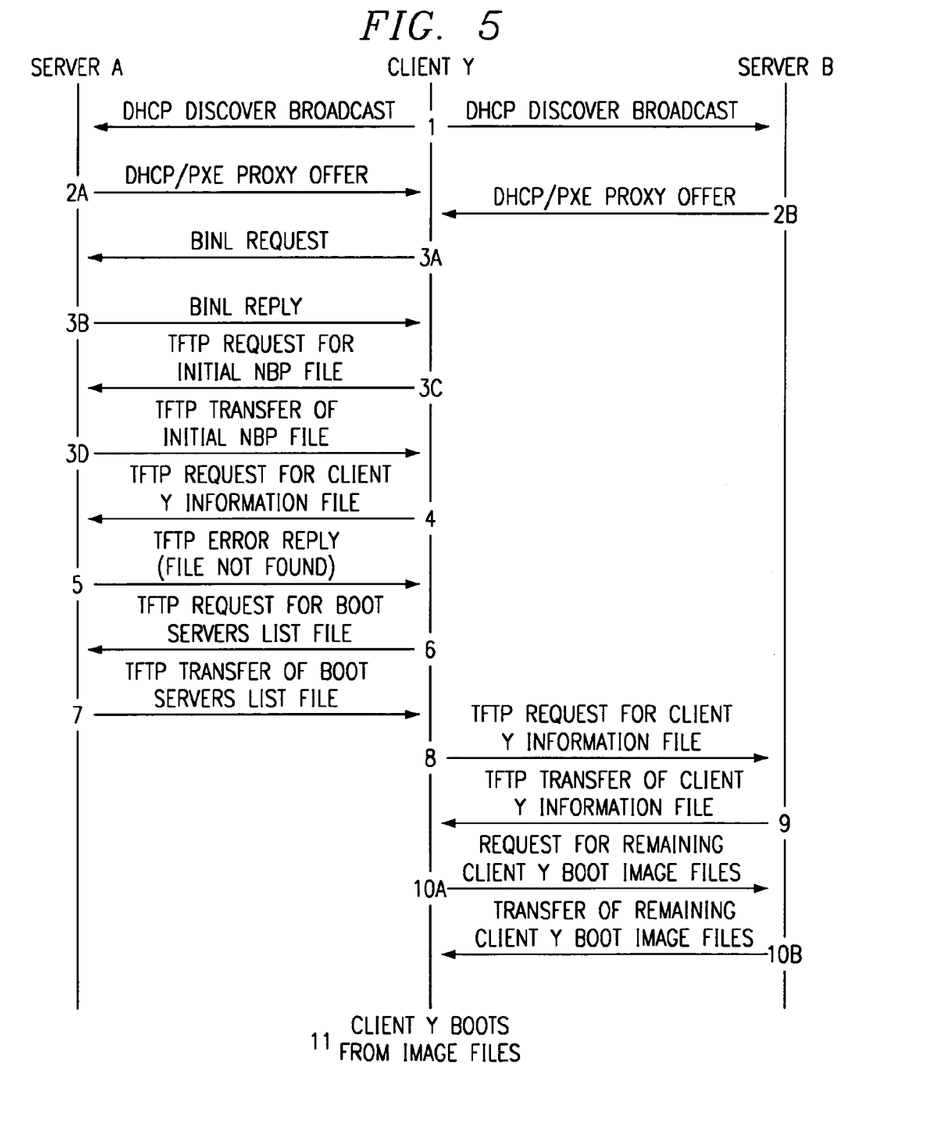
FIG. 5 is an exemplary data flow diagram illustrating a scenario, which would occur if the client were directed to an incorrect boot server, in accordance with a preferred embodiment of the present invention.

Turning now to FIG. 5, an exemplary data flow diagram is shown illustrating a scenario, which would occur if the client were directed to an incorrect boot server, in accordance with a preferred embodiment of the present invention. In the scenario illustrated in FIG. 5, the servers may be configured as demonstrated in the example shown in FIG. 4. The data flows between clients and servers as described in the following steps:

1. The PXE code in the network adapter of client Y initiates a remote boot by broadcasting a DHCP discovery packet containing DHCP PXE extensions. This broadcast is received by the DHCP/PXE proxy services located at both boot servers, server A and server B.

2. Both DHCP/PXE proxy servers respond to the client with DHCP offer packets containing DHCP PXE extensions. The packet from the DHCP PXE proxy service at server A (step 2A) indicates the IP address of boot server A, while the packet from the DHCP PXE proxy service at server B indicates the IP address of boot server B (step 2B).

3. The PXE code on the network attachment of client Y selects boot server A. Possible reasons for this selection may be that the offer from server A is received first or that the offer from server B is lost in the network and never received. Client Y sends a BINL request to server A (step 3A) and server A responds with a BINL reply indicating the IP address of boot server A (step 3B). Thereafter, the PXE code on the network adapter of client Y requests the file containing the common initial NBP via TFTP from boot server A (step 3C) and the boot server transfers the initial NBP file to client Y (step 3D).

4. The initial NBP is received at client Y and placed into operation by the PXE code on the network attachment on client Y. The NBP uses the unique hardware identifier of client Y to request the client-specific configuration information file from boot server A.

5. Since boot server A is not currently configured by the enterprise's primary server-managed client service with the software files needed to complete the remote boot of client Y, the TFTP service on boot server A does not find the requested client-specific information file for client Y. The TFTP service then sends an error reply to client Y indicating that the requested file is not found.

6. The initial NBP running on client Y receives the TFTP error reply and then requests the boot server list file via TFTP from boot server A.

7. The TFTP service on boot server A finds the common boot server list file and sends it via TFTP to client Y.

8. The initial NBP running on client Y receives the boot server list file. This file contains the IP addresses of boot server A, boot server B, and perhaps other boot servers configured by the enterprise's primary server-managed client service. The initial NBP begins to send requests via TFTP for the client-specific information file for client Y to each of the boot servers listed in the boot server list file except for the original boot server, server A.

9. When the request is sent to boot server B, the TFTP service on server B finds the file, since the file was placed on server B by the enterprise's primary server-managed client service when server B was configured with the software files needed to complete the remote boot of client Y. The TFTP service on boot server B then sends the client-specific configuration file to client Y.

10. The initial NBP running on client Y receives the client-specific configuration file from boot server B. Thereafter, the initial NBP halts its search for the file among the remaining boot servers listed in the boot server list file and uses the information in the client-specific information file to request the other software files from boot server B that are needed to complete the remote boot of client Y (step 10A). Boot server B responds by transferring the requested files (step 10B).

11. Client Y then boots from the image files retrieved from boot server B.

Figure 6:
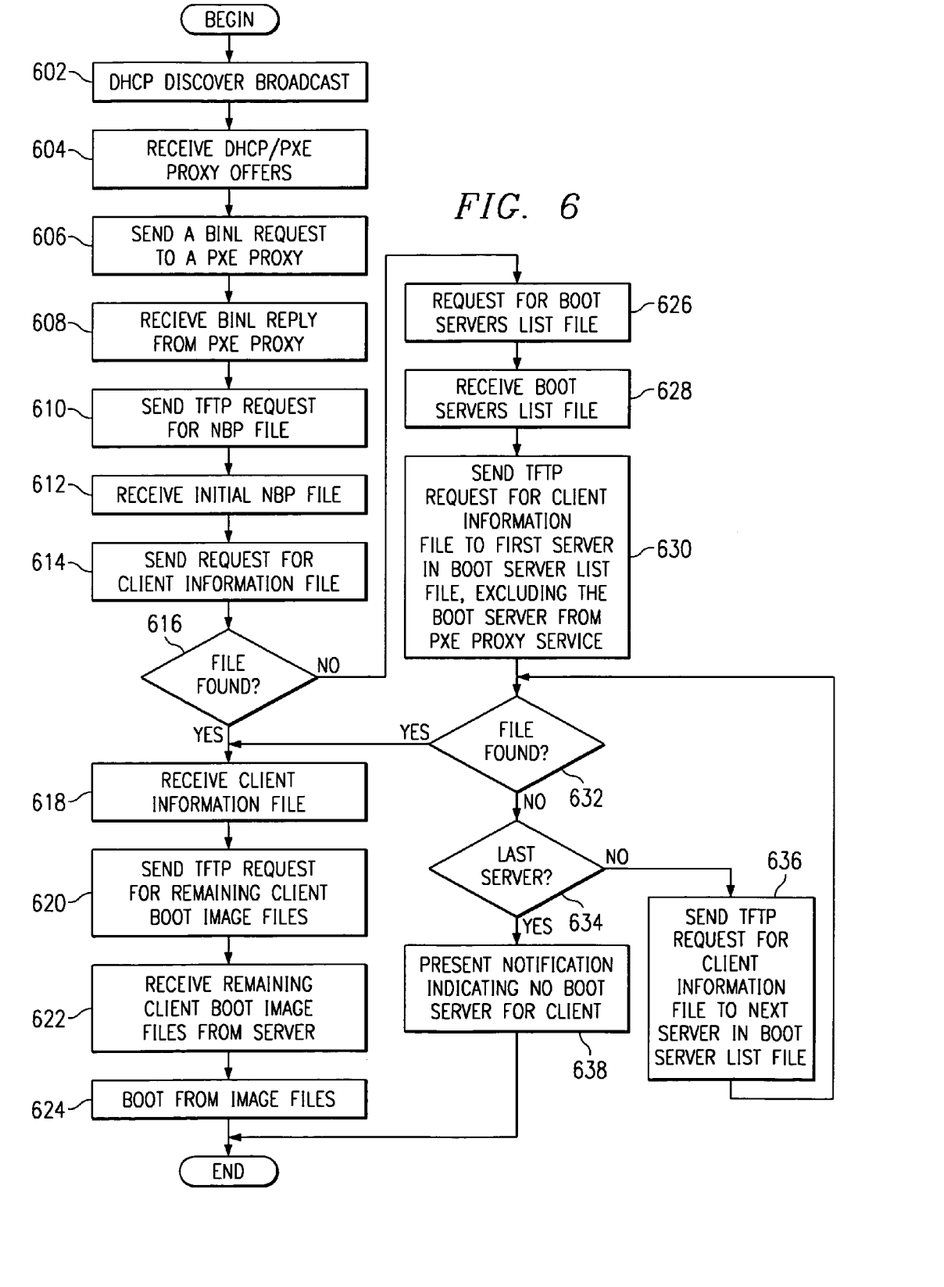
FIG. 6 is a flowchart illustrating the operation of a client attempting a remote boot in a network with multiple boot servers, in accordance with a preferred embodiment of the present invention.

With reference now to FIG. 6, a flowchart is shown illustrating the operation of a client attempting a remote boot in a network with multiple boot servers, in accordance with a preferred embodiment of the present invention. The process begins and sends a DHCP broadcast (step 602). Thereafter, the process receives DHCP/PXE proxy offers (step 604) and sends a BINL request to a BINL server (step 606). Then, the process receives a BINL reply from the BINL service (step 608) indicating the IP address of a boot server.

The process then sends a TFTP request for the initial NBP file (step 610) to the boot server indicated in the BINL reply, and receives the initial NBP file from the boot server (step 612). Next, the process sends a request for the client-specific information file from the boot server (step 614) and a determination is made as to whether the client-specific information file is found on the boot server (step 616).

If the file is found on the boot server, the process receives the client-specific information file (step 618), sends a TFTP request for the remaining client boot image files (step 620), and receives the remaining client boot image files from the boot server (step 622). Then, the process boots from the received image files (step 624) and ends.

If the file is not found on the boot server in step 616, the process sends a request for the boot server list file (step 626) and receives the boot server list file from the boot server (step 628). Thereafter, the process sends a TFTP request for the client-specific configuration information file to the first server selected from the boot server list file, excluding the boot server indicated by the PXE proxy service (step 630). A determination is made as to whether that boot server contains the client-specific information file (step 632).

If the client-specific information file is found on the boot server, the process proceeds to step 618 to retrieve the boot image files and boot from the boot server. If the client-specific information file is not found on the boot server in step 632, a determination is made as to whether the boot server is the last server that can be selected from the boot server list file (step 634). If the boot server is not the last server, the process sends a TFTP request for the client-specific information file to the next server selected from the boot server list file (step 636) and returns to step 632 to determine whether the client-specific information file is found on that boot server.

If, however, the boot server is the last boot server that can be selected from the boot server list file in step 634, the process presents notification indicating that no boot servers are found for the client (step 638) and ends.

Thus, the present invention solves the disadvantages of the prior art by providing a network environment with multiple boot servers without client-by-client configuration of DHCP/PXE proxy and BINL servers. Only the boot server list file needs to be changed when boot servers are added, deleted, or assigned to different clients to support load balancing, all of which should occur less frequently than client additions or deletions. The initial NBP need not be changed to account for changes in configuration. Assignments and reassignments of clients to boot servers by the enterprise's primary server-managed client service do not require any modifications to the DHCP/PXE proxy servers or the boot server list file.

The present invention does not require DHCP/PXE proxy servers to respond to only a specified set of clients. All PXE proxy servers may respond to all clients, providing redundancy if there are multiple DHCP PXE proxy servers. Thus, if a PXE proxy server is down, a client may still find a boot server. Also, the present invention does not require specific clients to be directed to particular boot servers by the DHCP/PXE proxy servers. All clients may be directed to the same boot server by each DHCP/PXE proxy server, since the transfer load is small for a "misdirected" client to acquire the initial NBP and the boot server list file. This makes the DHCP/PXE proxy server configuration easier to manage.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for retrieving client boot information in a network environment with multiple boot servers, comprising:
    initiating at a client an initial request for client configuration information;
    sending from the client the initial request for client configuration information to a first boot server;
    receiving at the client a boot server list if the client configuration information is not found on the first boot server; and
    sending from the client a configuration information request for the client configuration information to each server in the boot server list until the client configuration information is found or a request has been sent to every server in the boot server list.

2. The method of claim 1, wherein at least one of the initial request, the list request, and the configuration information request is a trivial file transfer protocol request.

3. The method of claim 1, further comprising:
    receiving, from the first boot server, an error message that indicates that the client information is not found on the first boot server.

4. The method of claim 1, further comprising:
    receiving the client configuration information from an associated boot server in response to the client configuration information being found.

5. The method of claim 4, further comprising:
    sending a boot file request for remaining boot files to the associated boot server based on the client configuration information.

6. The method of claim 1, further comprising:
    determining whether the entries in the boot server list were pre-ordered, in order to better support load balancing among boot servers, prior to transmission to the client; and
    if the list is found to be ordered, sending a configuration information request for the client configuration information to each server in the boot server list in the order given.

7. The method of claim 1, further comprising:
    sending a configuration information request for the client configuration information to each server in the boot server list in order of increasing network distance, where distance is estimated from available network configuration information when there was no indication that the order of the original boot server list was optimized in order to better support load balancing.

8. The method of claim 1, wherein the method is performed by a network bootstrap program.

9. The method of claim 1, wherein the method is performed on a client computer.

10. A method for providing client boot information in a network environment with multiple boot servers, comprising:
    receiving at a boot server an initial request for client configuration information from a client, wherein the initial request is initiated at the client;
    sending from the boot server a boot server list to the client if the client configuration information is not found; and
    adding an indication to the boot server list to inform the client that the list is being provided in optimal order to support load balancing among boot servers.

11. The method of claim 10, wherein at least one of the initial request and the list request is a trivial file transfer protocol request.

12. An apparatus for retrieving client boot information in a network environment with multiple boot servers, comprising:
    initiating means for initiating at a client an initial request for client configuration information;
    first sending means for sending from a client an initial request for client configuration information to a first boot server;
    receipt means for receiving at the client a boot server list if the client configuration information is not found on the first boot server; and
    second sending means for sending from the client a configuration information request for the client configuration information to each server in the boot server list until the client configuration information is found or a request has been sent to every server in the boot server list.

13. The apparatus of claim 12, wherein at least one of the initial request, the list request, and the configuration information request is a trivial file transfer protocol request.

14. The apparatus of claim 12, further comprising:
    means for receiving, from the first boot server, an error message that indicates that the client information is not found on the first boot server.

15. The apparatus of claim 12, further comprising:
    means for receiving the client configuration information from an associated boot server in response to the client configuration information being found; and
    means for sending a boot file request for remaining boot files to the associated boot server based on the client configuration information.

16. The apparatus of claim 12, further comprising:
    means for determining whether the entries in the boot server list were pre-ordered, in order to better support load balancing among boot servers, prior to transmission to the client; and
    if the list is found to be ordered, means for sending a configuration information request for the client configuration information to each server in the boot server list in the order given.

17. The apparatus of claim 12, further comprising:
    means for sending a configuration information request for the client configuration information to each server in the boot server list in order of increasing network distance, where distance is estimated from available network configuration information when there was no indication that the order of the original boot server list was optimized in order to better support load balancing.

18. The apparatus of claim 12, wherein the apparatus is client computer running a network bootstrap program.

19. An apparatus for providing client boot information in a network environment with multiple boot servers, comprising:

receipt means for receiving at a boot server an initial request for client configuration information from a client, wherein the initial request is initiated at the client;

sending means for sending from the boot server a boot server list to the client if the client configuration information is not found; and adding means for adding an indication to the boot server list to inform the client that the list is given in optimal order to support load balancing among boot servers.

20. The apparatus of claim 19, wherein at least one of the initial request and the list request is a trivial file transfer protocol request.

21. A computer program product, in a computer readable storage medium, for retrieving client boot information in a network environment with multiple boot servers, comprising:

instructions for initiating at a client an initial request for client configuration information;

instructions for sending from the client an initial request for client configuration information to a first boot server;

instructions for receiving at the client a boot server list if the client configuration information is not found on the first boot server; and instructions for sending from the client a configuration information request for the client configuration information to each server in the boot server list until the client configuration information is found or a request has been sent to every server in the boot server list.

22. A computer program product, in a computer readable storage medium, for providing client boot information in a network environment with multiple boot servers, comprising:

instructions for receiving at a boot server an initial request for client configuration information from a client, wherein the initial request is initiated at the client;

instructions for sending from the boot server a boot server list to the client if the client configuration information is not found; and instructions for adding an indication to the boot server list to inform the client that the list is being provided in optimal order to support load balancing among boot servers.

* * * * *